US006971957B2

(12) United States Patent
Osako

(10) Patent No.: US 6,971,957 B2
(45) Date of Patent: Dec. 6, 2005

(54) GAME SYSTEM AND PROGRAM USING A SHADOW VOLUME TO DISPLAY A SHADOW OF AN OBJECT IN A THREE DIMENSIONAL VIDEO GAME

(75) Inventor: Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 77 days.

(21) Appl. No.: 10/408,368

(22) Filed: Apr. 8, 2003

(65) Prior Publication Data

US 2003/0228905 A1 Dec. 11, 2003

(30) Foreign Application Priority Data

Jun. 7, 2002 (JP) .............................. 2002-167654

(51) Int. Cl.[7] .............................................. A63F 13/00
(52) U.S. Cl. ....................................... 463/31; 345/426
(58) Field of Search .............. 463/1–43; 345/421–426, 345/427, 418

(56) References Cited

U.S. PATENT DOCUMENTS

| | | | |
|---|---|---|---|
| 4,600,200 A | | 7/1986 | Oka et al. |
| 5,577,175 A | * | 11/1996 | Naka et al. .................. 345/427 |
| 5,914,721 A | * | 6/1999 | Lim ............................ 345/421 |
| 5,936,626 A | | 8/1999 | Beasley |
| 5,947,823 A | * | 9/1999 | Nimura ........................ 463/32 |
| 6,203,431 B1 | * | 3/2001 | Miyamoto et al. ............ 463/31 |
| 6,322,448 B1 | | 11/2001 | Kaku et al. |
| 6,482,090 B1 | | 11/2002 | Rimoto et al. |
| 6,529,194 B1 | * | 3/2003 | Yamaguchi .................. 345/426 |
| 6,572,475 B1 | * | 6/2003 | Okabe et al. .................. 463/30 |
| 6,589,117 B1 | * | 7/2003 | Moritome et al. ............. 463/37 |
| 6,624,833 B1 | * | 9/2003 | Kumar et al. ................ 345/863 |
| 6,646,640 B2 | * | 11/2003 | Nagy ........................ 345/426 |
| 6,664,962 B1 | * | 12/2003 | Komsthoeft et al. ........ 345/426 |
| 6,667,741 B1 | * | 12/2003 | Kataoka et al. ............. 345/426 |
| 6,676,518 B1 | | 1/2004 | Sawa et al. |
| 6,677,946 B1 | * | 1/2004 | Ohba ........................ 345/426 |
| 6,712,700 B1 | | 3/2004 | Imai et al. |
| 6,717,575 B2 | * | 4/2004 | Hino et al. .................. 345/418 |
| 6,771,265 B1 | * | 8/2004 | Shimono ..................... 345/426 |
| 6,791,544 B1 | * | 9/2004 | Hong et al. .................. 345/426 |
| 2003/0216175 A1 | | 11/2003 | Osako et al. |

\* cited by examiner

*Primary Examiner*—Michael O'Neill
(74) *Attorney, Agent, or Firm*—Nixon & Vanderhye P.C.

(57) ABSTRACT

A DVD-ROM stores a plurality of shadow volume data corresponding to respective attitudes of an object which casts a shadow. A CPU sets a shadow volume corresponding to the attitude of the object by performing interpolation based on the shadow volume data as necessary. Based on the thus-set shadow volume, a GPU determines a shadow region using a stencil buffer. Based on the determined results, the GPU updates luminance information of each pixel stored in a color buffer. According to this configuration, when a game system uses the shadow volume to draw a shadow, it is possible to reduce the processing load caused by setting the shadow volume while drawing a more realistic shadow corresponding to the attitude of the object which casts the shadow.

16 Claims, 14 Drawing Sheets

FIG. 4
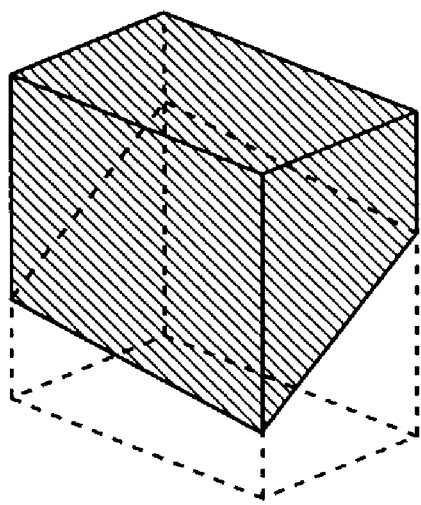
(a) FRONT SIDE SURFACE
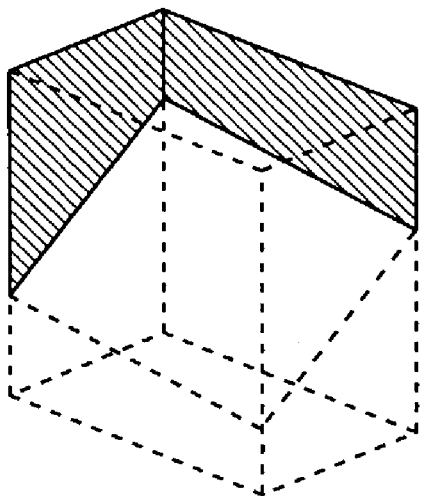
(b) BACK SIDE SURFACE
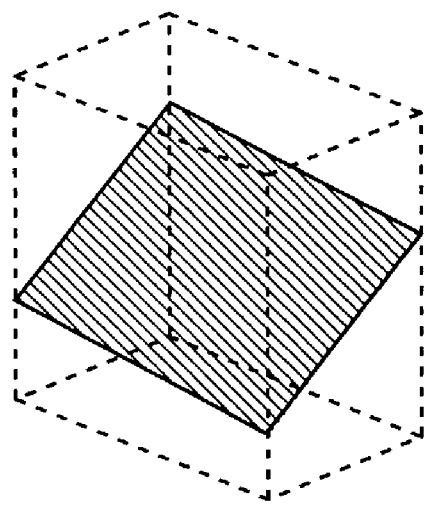
(a) − (b)

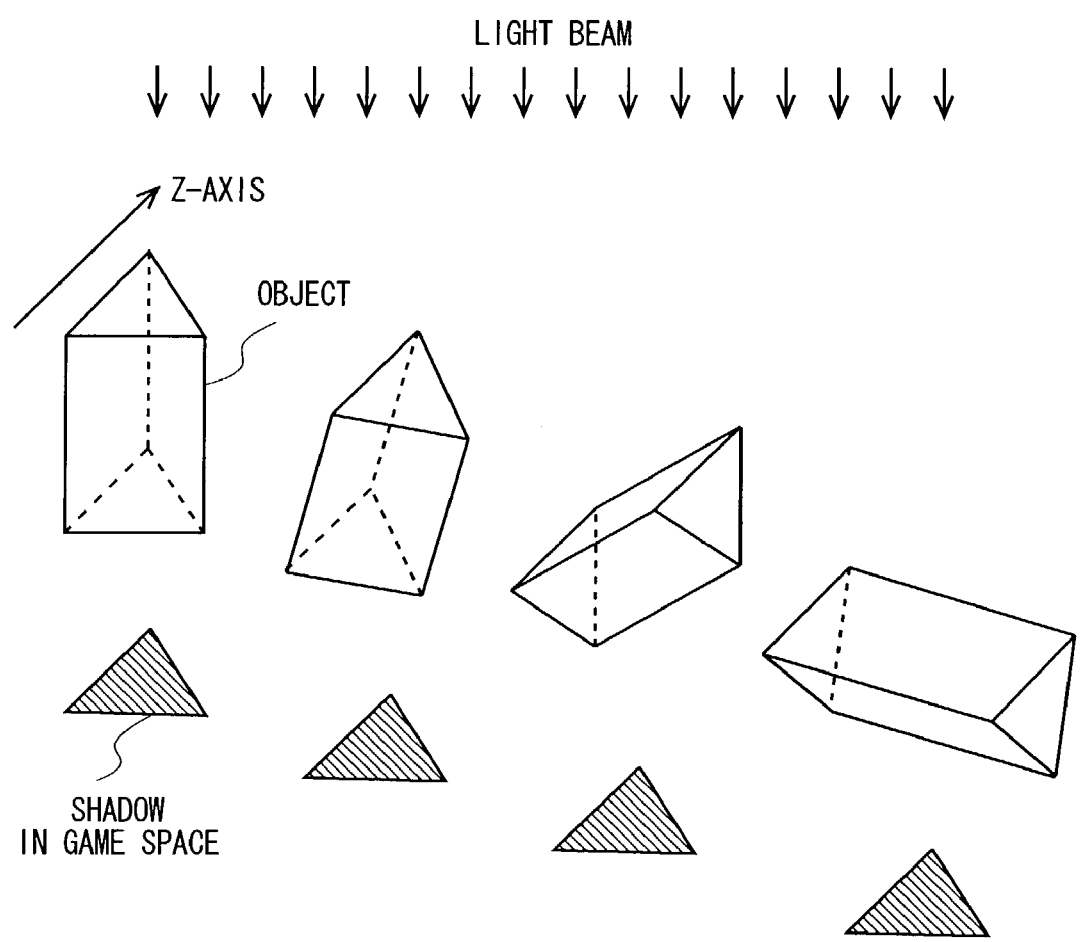

GAME SYSTEM AND PROGRAM USING A SHADOW VOLUME TO DISPLAY A SHADOW OF AN OBJECT IN A THREE DIMENSIONAL VIDEO GAME

FIELD OF THE INVENTION

The present invention relates to a game system and a game program. More particularly, the disclosed system relates to a game system and a game program which use a shadow volume to display the shadow of an object in a three-dimensional game space.

BACKGROUND AND SUMMARY OF THE INVENTION

Methods for conventionally drawing a shadow in a three-dimensional virtual space using a shadow volume are known. Conventional methods for drawing a shadow using the shadow volume are roughly classified into the following two types.

The first type includes methods in which the shadow volume is set by extending a line from each vertex of all the polygons forming an object, which casts a shadow, along the direction of a light beam. The second type includes methods in which the shadow volume is set by extracting the outline of an object which casts a shadow and extending the outline along the direction of a light beam.

In methods of the first type, new polygons are formed with respect to all the edges of all the polygons forming the object which casts a shadow, so that the number of polygons forming the shadow volume is large. As a result, a large memory space is required and the processing load of such a drawing process is great. On the other hand, in methods of the second type, the number of polygons forming the shadow volume is small compared to the methods of the first type. However, processing requirements for extracting the outline of the object which casts a shadow results in a processing load which is also great.

As described above, in the conventional methods, the processing load and the processing time required for drawing a shadow by forming a shadow volume is great. Therefore, it is substantially impossible for a conventional game system, which is required to draw a virtual space in real time, to employ such conventional methods.

Accordingly, in conventional game systems, in order to reduce the processing load of drawing a shadow, polygons used for shadow are prepared beforehand and placed in suitable positions for drawing a shadow, instead of forming a shadow volume. However, such methods cannot correctly draw a shadow when an object over which a shadow is cast has an uneven surface.

Shadow volumes, however, when used in the above-described manner for such a case can correctly draw a shadow in accordance with the unevenness of the object over which a shadow is cast. Accordingly, if shadow volume data is preset in a fixed manner and a game apparatus can read and use the data as necessary, processing for calculating the shadow volume data in real time is not required, and therefore the processing load of drawing a shadow is small.

However, in such a solution method as described above, the shape of the shadow volume is predetermined, and therefore the shadow is drawn unnaturally when the attitude of the object which casts a shadow is changed by rotation or the like. For example, as shown in FIG. 14, when an object having a triangular prism-like shape (the object which casts a shadow) is rotated about an axis (in this case, the Z-axis), it is natural for the shadow of the object to be deformed in accordance with the rotation. However, according to the above-described solution method, the shadow in the game space does not change and thus is unnatural.

Therefore, a feature of the exemplary embodiments is to provide a game system using a shadow volume for drawing a shadow which is capable of reducing the processing load caused by setting the shadow volume while drawing a realistic shadow in accordance with the attitude of an object which casts the shadow.

Another feature of the exemplary embodiments is to provide a game program which is capable of reducing the processing load caused by setting the shadow volume used for drawing a shadow by the game system while drawing a realistic shadow in accordance with the attitude of the object which casts the shadow.

The exemplary embodiments have the following features to attain the features mentioned above.

A first aspect of the exemplary embodiments is directed to a game system for displaying a shadow of an object in a three-dimensional game space by using a shadow volume, the game system comprising: an attitude changing mechanism (corresponding to, for example, a CPU 10 performing steps S2 and S4; hereinafter, only step numbers are shown); first shadow volume data storage (a DVD-ROM 300 or a RAM in a main unit of the system, such as a main memory 17); second shadow volume data storage (the DVD-ROM 300 or the RAM in the main unit of the system, such as the main memory 17); a shadow volume setting mechanism (S12); and a shadow drawing mechanism (S13). The attitude changing mechanism changes the attitude of the object by calculating, for example, effects of operation inputs by the player, contact with other objects, inclination of the ground, etc. The first shadow volume data storage has previously stored therein first shadow volume data (e.g., shadow volume data for 0° in FIG. 5) corresponding to the first attitude of the object (e.g., the state where the angle of rotation around the Z-axis in the object coordinate system is 0°; the state of 0° in FIG. 5). The second shadow volume data storage has previously stored therein second shadow volume data (e.g., shadow volume data for 30° in FIG. 5) corresponding to the second attitude of the object which is different from the first attitude (e.g., the state where the angle of rotation around the Z-axis in the object coordinate system is 30°; the state of, for example, 30° in FIG. 5). The shadow volume setting mechanism sets the shadow volume based on the first shadow volume data when the attitude of the object, which is changed by the attitude changing mechanism, at a certain point in time is identical to the first attitude and sets the shadow volume based on the second shadow volume data when the attitude of the object at the certain point in time is identical to the second attitude. The shadow drawing mechanism draws a shadow of the object at the certain point in time based on the shadow volume set by the shadow volume setting mechanism. As such, the previously stored shadow volume data is used so that the processing load caused by setting the shadow volume is reduced, and shadow volume data corresponding to two different attitudes are previously stored. Therefore, it is possible to display a shadow corresponding to various attitudes of the object, and it is also possible to draw a more realistic shadow in accordance with the attitude of the object which casts a shadow and the unevenness of an object over which a shadow is cast. Note that reference numerals and the like shown in brackets are only provided for facilitating the understanding of the present aspect and are not intended to limit the present aspect.

According to a second aspect based on the first aspect, the shadow volume setting mechanism sets the shadow volume by interpolation based on the first shadow volume data and the second shadow volume data when the attitude of the object at the certain point in time is different from both the first attitude and the second attitude (S123). Therefore, it is possible to reduce the number of shadow volume data to be prepared beforehand while displaying shadows corresponding to various attitudes.

Further, according to a third aspect based on the second aspect, the interpolation is linear interpolation. Therefore, it is possible to perform interpolation more simply.

Furthermore, according to a fourth aspect based on the first aspect, the second shadow volume data (e.g., shadow volume data for 30° in FIG. 8) is offset data referencing the first shadow volume data (shadow volume data for 0° in FIG. 8). Therefore, it is possible to reduce the size of the second shadow volume data. Also in the second aspect, it is possible to make a calculation regarding interpolation by utilizing the offset data, and therefore the load of interpolation calculation processing is small.

Further still, according to a fifth aspect based on the first aspect, the attitude changing mechanism rotates the object about a prescribed axis in an object coordinate system (the Z-axis in FIG. 5; the Z-axis in the object coordinate system, i.e., an axis along the progress direction of the object); the second attitude is an attitude of the object rotated around the prescribed axis by a certain angle from the first attitude; and the shadow volume setting mechanism sets the shadow volume based on the angle of rotation of the object around the prescribed axis. Therefore, if the object is rotated, it is possible to change the display of the shadow in accordance with the rotation.

Further still, according to a sixth aspect, in the fifth aspect, when the attitude of the object at the certain point in time is equal to a third attitude (e.g., the state of 135° n FIG. 13) which is in a prescribed relationship to the first attitude (e.g., the state of 45° in FIG. 13), the shadow volume setting mechanism sets the shadow volume by using the first shadow volume data, which is left unchanged or is suitably changed, as shadow volume data corresponding to the third attitude. Therefore, a single shadow volume can be commonly used for setting shadow volumes corresponding to a plurality of different attitudes, thereby reducing the number of shadow volume data to be prepared beforehand.

Further still, according to a seventh aspect, in the sixth aspect, shapes of the object are symmetric with respect to a plane including the prescribed axis (e.g., a YZ plane where the X-axis in the object coordinate system corresponds to the right direction of the object, the Y-axis corresponds to the vertical direction, and the Z-axis corresponds to the progress direction). Therefore, even if the shadow volume data is commonly used for the first attitude and the third attitude, no shadows are displayed unnaturally.

Further still, according to a eighth aspect, in the sixth aspect, the third attitude (e.g., the state of −135° in FIG. 13) is an attitude of the object rotated around the prescribed axis in the world coordinate system by 180° from the first attitude (e.g., the state of 45° in FIG. 13).

Further still, a ninth aspect of the present invention is directed to a game program executed by a computer in a game apparatus for displaying a shadow of an object in a three-dimensional game space by using a shadow volume, the game program causing the computer to execute an attitude changing step (S2 and S4), a first shadow volume data reading step (e.g., S122), a second shadow volume data reading step (e.g., S123), a shadow volume setting step (S124), and a shadow drawing step (S13). The attitude changing step changes an attitude of the object. The first shadow volume data reading step reads a previously stored first shadow volume data corresponding to a first attitude of the object (e.g., the state where the angle of rotation around the Z-axis in the object coordinate system is 0°). The second shadow volume data reading step reads a previously stored second shadow volume data corresponding to a second attitude of the object which is different from the first attitude (e.g., the state where the angle of rotation around the Z-axis in the object coordinate system is 30°). The shadow volume setting step sets the shadow volume based on the first shadow volume data when the attitude of the object, which is changed by the attitude changing step, at a certain point in time is identical to the first attitude and sets the shadow volume based on the second shadow volume data when the attitude of the object at the certain point in time is identical to the second attitude. The shadow drawing step draws a shadow of the object at the certain point in time based on the shadow volume set by the shadow volume setting step. As such, the previously stored shadow volume data is used so that the processing load caused by setting the shadow volume is reduced, and shadow volume data corresponding to two different attitudes are previously stored. Therefore, it is possible to display a shadow corresponding to various attitudes of the object, and it is also possible to draw a more realistic shadow in accordance with the attitude of the object which casts a shadow and the unevenness of an object over which a shadow is cast.

Further still, according to a tenth aspect based on the ninth aspect, when the attitude of the object at the certain point in time is different from both the first attitude and the second attitude, the shadow volume setting step sets the shadow volume by interpolation based on the first shadow volume data and the second shadow volume data (S123).

Further still, according to an eleventh aspect based on the tenth aspect, the interpolation is linear interpolation.

Further still, according to a twelfth aspect based on the ninth or tenth aspect, the second shadow volume data is offset data referencing the first shadow volume data.

Further still, according to a thirteenth aspect based on the ninth aspect, the attitude changing step rotates the object about a prescribed axis in the object coordinate system, the second attitude is an attitude of the object rotated around the prescribed axis by a certain angle from the first attitude, and the shadow volume setting step sets the shadow volume based on the angle of rotation of the object around the prescribed axis.

Further still, according to a fourteenth aspect based on the ninth aspect, when the attitude of the object at the certain point in time is equal to the third attitude which is in a prescribed relationship to the first attitude, the shadow volume setting step sets the shadow volume by using the first shadow volume data, which is left unchanged or is suitably changed, as shadow volume data corresponding to the third attitude.

Further still, according to a fifteenth aspect based on the fourteenth aspect, shapes of the object are symmetric with respect to a plane including the prescribed axis.

Further still, according to a sixteenth aspect based on the fourteenth aspect, the third attitude is an attitude of the object rotated around the prescribed axis in the world coordinate system by 180° from the first attitude.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram for explaining a technique for drawing a shadow using a stencil buffer;

FIG. 14 is a diagram illustrating shadows displayed along with movements of an object in a virtual example.

DESCRIPTION OF THE PREFERRED EMBODIMENTS

Figure 1:
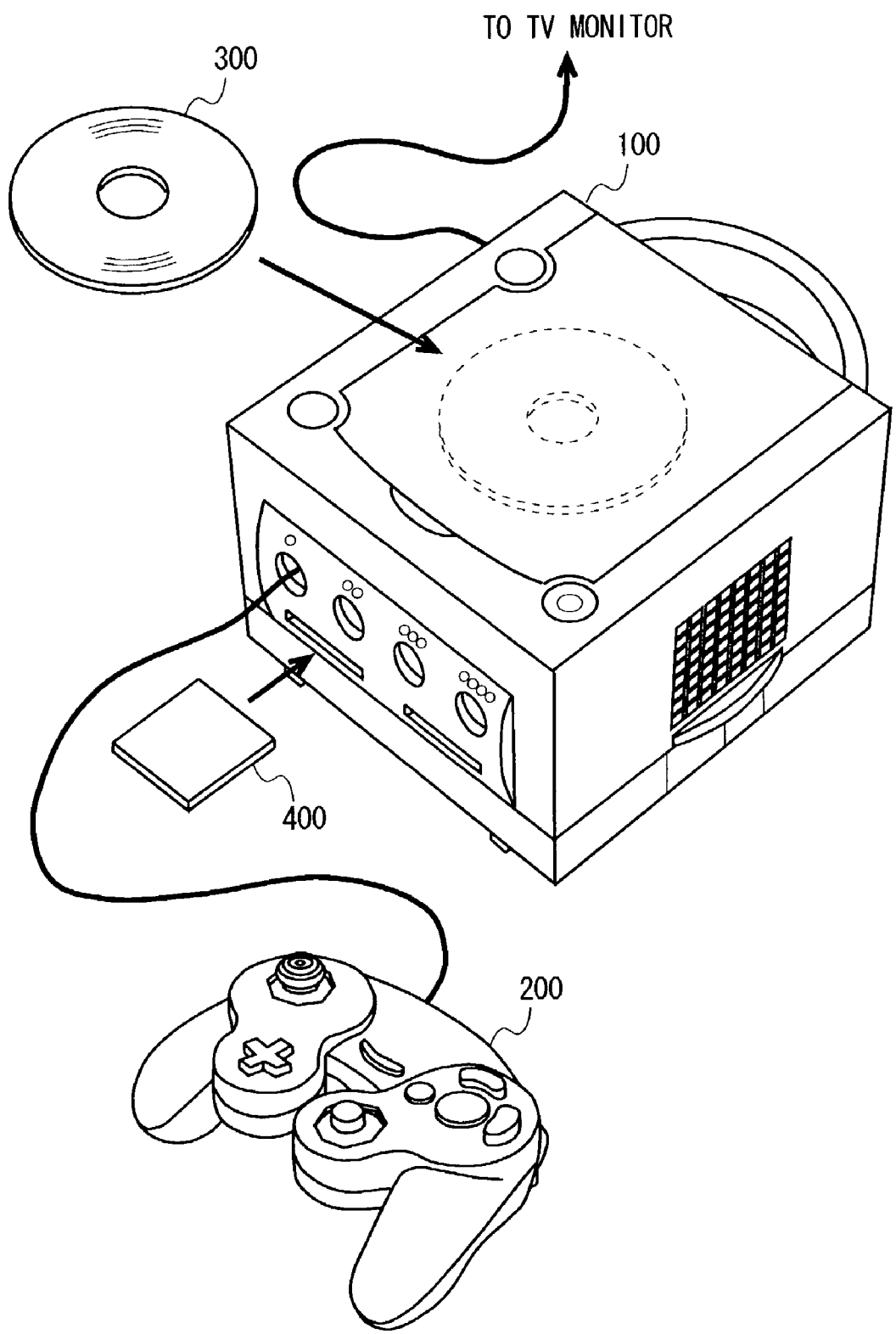
FIG. 1 is a view illustrating the appearance of a game system according to an embodiment of the present invention.
Figure 2:
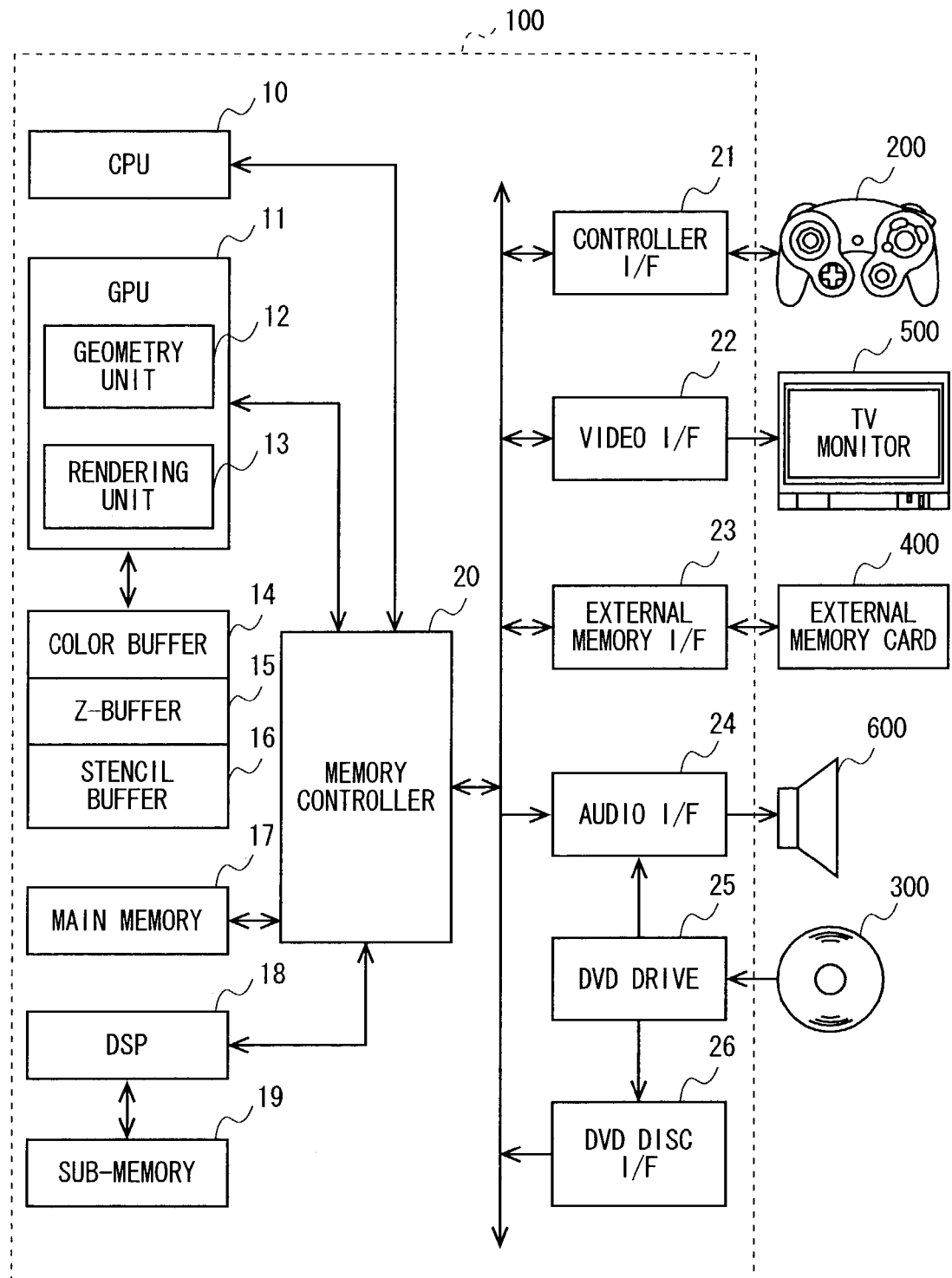
FIG. 2 is a block diagram illustrating the configuration of the game system illustrated in FIG. 1.

FIG. 1 is an external view illustrating the configuration of a game system according to an embodiment of the present invention. FIG. 2 is a block diagram of the game system illustrated in FIG. 1. As shown in FIGS. 1 and 2, the game system includes the main body of a game machine 100, a DVD-ROM 300, and a controller 200. The main body of the game machine 100 is connected to a loudspeaker 600 and a TV monitor 500. Additionally, an external memory card 400 is provided to the game system as necessary. The DVD-ROM 300 and the external memory card 400 are removably loaded into the main body of the game machine 100. The controller 200 is connected via a communication cable to any one of a plurality of controller port connectors (four connectors are shown in FIG. 1) provided in the main body of the game machine 100. The TV monitor 500 and the loudspeaker 600 are connected to the main body of the game machine 100 via an AV cable or the like. It should be noted that the communication between the main body of the game machine 100 and the controller 200 may be performed wirelessly. Each part of the game system will be described in more detail below with reference to FIG. 2.

The DVD-ROM 300 fixedly stores a game program and data regarding the game, such as character data. When the player plays the game, the DVD-ROM 300 is loaded into the main body of the game machine 100. As means for storing the game program, etc., an external storage medium, such as a CD-ROM, an MO, a memory card, a ROM cartridge, or the like, may be used instead of using the DVD-ROM 300.

The external memory card 400 is formed by a rewritable storage medium, such as a flash memory or the like, and stores data, e.g. save data in a game.

The main body of the game machine 100 reads the game program stored in the DVD-ROM 300 and performs game processing.

The controller 200 is an input device for the player to input information related to game operations and has a plurality of operating switches. The controller 200 outputs operation data to the main body of the game machine 100 in response to the player pressing an operating switch, for example.

The TV monitor 500 displays image data output by the main body of the game machine 100 on the display screen. The loudspeaker 600 is typically included in the TV monitor 500 and outputs audio in the game output by the main body of the game machine 100.

The configuration of the main body of the game machine 100 will now be described. In FIG. 2, the main body of the game machine 100 includes a CPU 10 and a memory controller 20 connected thereto. In the main body of the game machine 100, the memory controller 20 is also connected to a graphics processing unit (GPU) 11, a main memory 17, a DSP 18, and various interfaces (I/F) 21–24 and 26. The memory controller 20 controls data transfer between these elements.

In order to start the game, firstly, a DVD drive 25 drives the DVD-ROM 300 loaded into the main body of the game machine 100. The game program stored in the DVD-ROM 300 is read by the main memory 17 via the DVD disc I/F 26 and the memory controller 20. When the program in the main memory 17 is executed by the CPU 10, the game is started. After the start of the game, the player performs input operations, such as game operations, by using operation switches of the controller 200. In response to the input operations by the player, the controller 200 outputs operation data to the main body of the game machine 100. The operation data output by the controller 200 is input to the CPU 10 via the controller I/F 21 and the memory controller 20. The CPU 10 performs game processing in accordance with the input operation data. For example, the GPU 11 and the DSP 18 are used for creating image data during game processing. A sub-memory 19 is used when the DSP 18 performs prescribed processing.

The GPU 11 includes a geometric unit 12 and a rendering unit 13 and is connected to a memory exclusively used for image processing. The memory exclusively used for image processing is used as, for example, a color buffer 14, a Z-buffer 15, or a stencil buffer 16. The geometry unit 12 performs arithmetic processing regarding coordinates of a three-dimensional model related to an object or graphics placed in a game space, which is a virtual three-dimensional space, (e.g., an object formed by polygons). Examples of such arithmetic processing include the rotation, scaling, and deformation of the three-dimensional model, and coordinate conversions from the world coordinate system to the viewing coordinate system or screen coordinate system. Based on a prescribed texture, the rendering unit 13 creates a game image by writing to the color buffer 14 color data (RGB data) for each pixel of the three-dimensional model projected onto the screen coordinate system. The color buffer 14 is a memory region reserved for holding game image data (RGB data) created by the rendering unit 13. The Z-buffer 15 is a memory region reserved for holding depth information regarding the depth of field from a viewpoint which is lost when the conversion from the three-dimensional viewing coordinate to the two-dimensional screen coordinate is performed. The stencil buffer 16 is a memory region reserved for performing determination regarding a shadow region by using the shadow volume which will be described later. The GPU 11 uses these buffers to create image data to be displayed on the TV monitor 500 and suitably outputs the image data to the TV monitor 500 via the memory controller 20 and the video I/F 22. Audio data created by the CPU 10 when the game program is executed is output via the memory controller 20 through the audio I/F 24 to the loudspeaker 600. In the present embodiment, hardware configuration includes the additional memory exclusively used for image processing, but the present invention is not limited to this. For example, a scheme in which part of the main memory 17 is used as a memory for image processing, (UMA: Unified Memory Architecture), may be employed.

Hereinafter, the operation of the present embodiment will be described.

In the present embodiment, as shadow volume data, a plurality of shadow volumes are prepared beforehand for an object which casts a shadow. The term "shadow volume" defines a space over which an object casts a shadow, or a space in which light from the light source is blocked by such an object. By using the shadow volume, it is possible to correctly display a shadow which is cast over complicated topographic features. Shadow drawing processing which uses the shadow volume will be described below with reference to various drawings.

Figure 3:
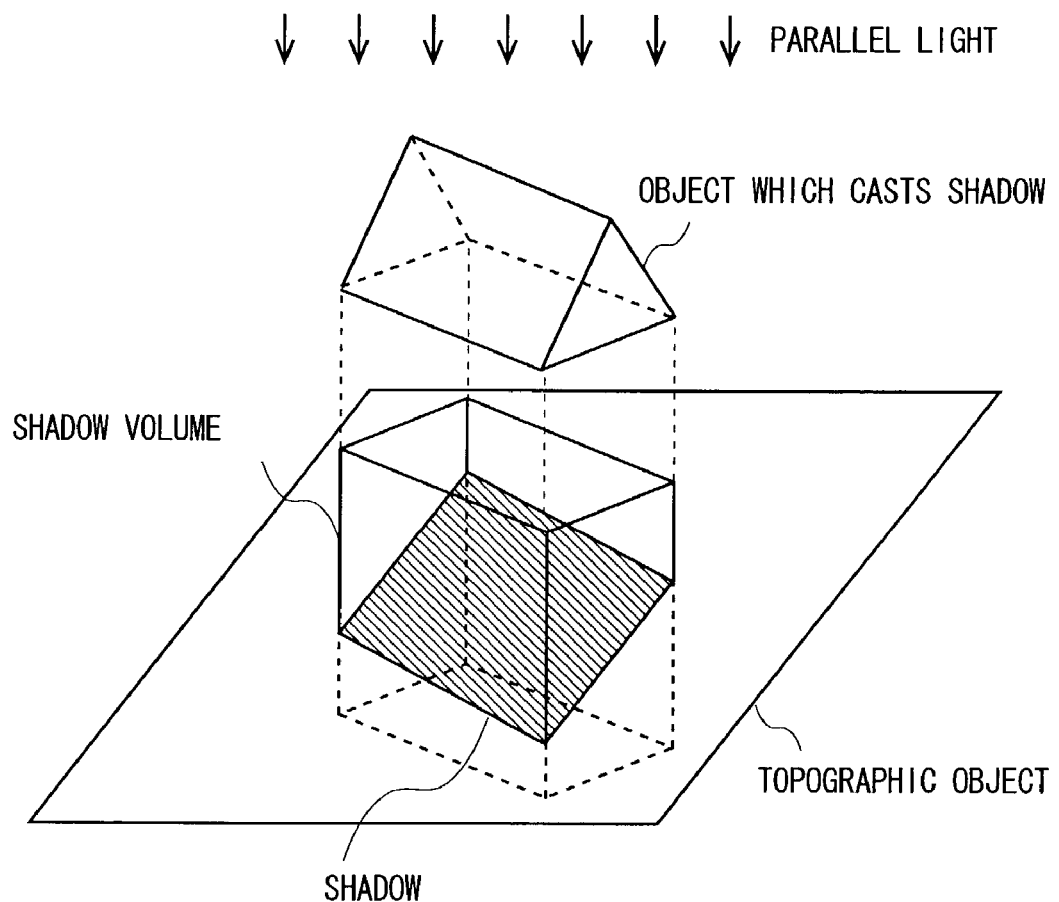
FIG. 3 is a diagram for explaining the relationship between a shadow volume and the shadow.

As shown in FIG. 3, in a topographic object, a shadow is created in a region where an object which casts a shadow overlaps with the topographic object (hereinafter, referred to as the "shadow region"). In FIG. 3, although the case where parallel light is used is illustrated, the shadow is similarly created in the case where a point source of light is used. The shadow region can be easily determined by using a stencil buffer. As a general technique for determining the shadow region by using the stencil buffer, as shown in FIG. 4, firstly, (a) front side surfaces of the shadow volume are drawn with reference to the Z-buffer (in this case, each pixel value in the stencil buffer is incremented instead of updating color information for each pixel in the color buffer), and then (b) back side surfaces of the shadow volume are drawn with reference to the Z-buffer (in this case, each pixel value in the stencil buffer is decremented instead of updating the color information for each pixel in the color buffer). Consequently, when the initial value is "0", each pixel value in the stencil buffer becomes "1" in the portion corresponding to the shadow region and becomes "0" in the other portions. The color information in the color buffer is changed based on each pixel value in the stencil buffer. For example, among luminance information stored in each pixel of the color buffer based on the texture of the topographic object, values of luminance information corresponding to the shadow region are reduced. As a result, a realistic shadow can be displayed.

In the present embodiment, a plurality of shadow volume data corresponding to attitudes of the object which casts a shadow are prepared beforehand. The shadow volume is set based on these shadow volume data. The thus-set shadow volume is used to draw a shadow in the game space.

In the present embodiment, by way of example, the case where the object which casts a shadow is rotated about a prescribed axis (in this case, the Z-axis in the object coordinate system; in some portions of the following description, "the Z-axis in the object coordinate system" is simply referred to as the "Z-axis") in the range between +90° and −90° from a reference position will be described. In the actual game, e.g., a cart race game, the above-mentioned exemplary case corresponds to the case where the cart is rotated about a vector along a progress direction of the cart, i.e., the cart is laterally turned, (in the present embodiment, the right-handed rotation when facing the progress direction is a positive direction). The attitude of the object is represented by an angle of rotation about the Z-axis.

Figure 5:
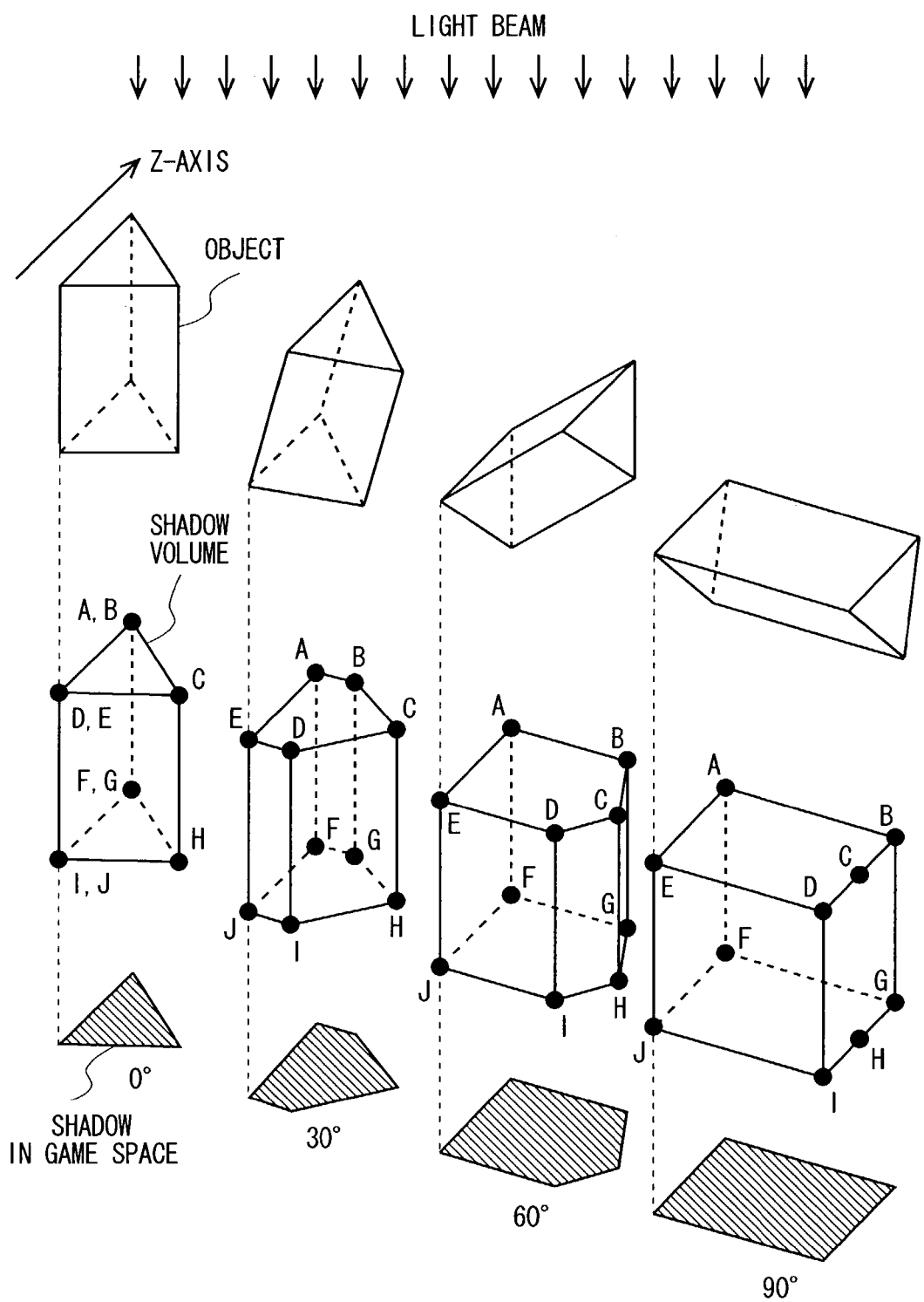
FIG. 5 is a diagram illustrating shapes of shadow volumes and shadows in a game space when angles of rotation of an object around the Z-axis are 0°, 30°, 60°, and 90°.
Figure 6:
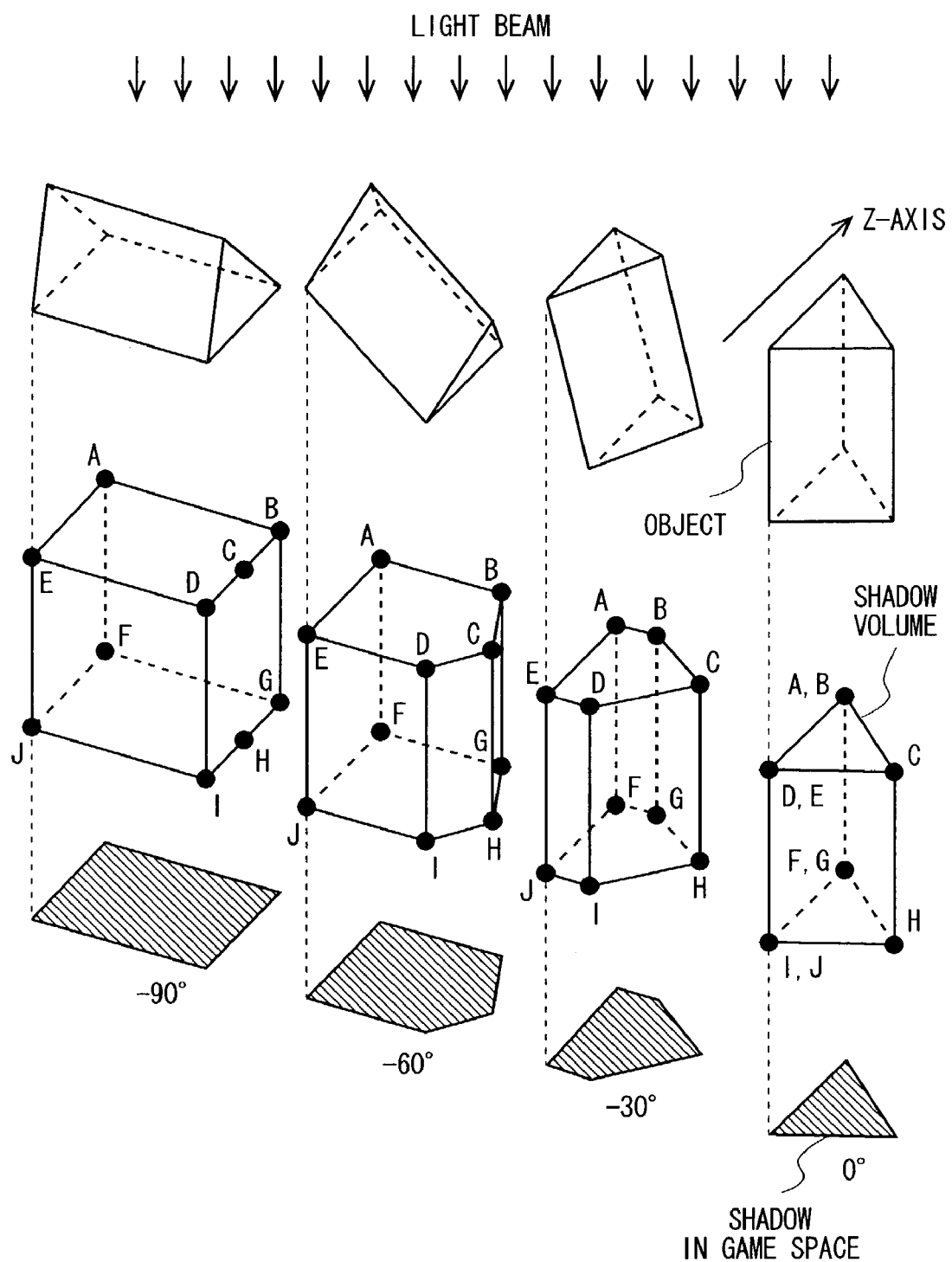
FIG. 6 is a diagram illustrating shapes of shadow volumes and shadows in a game space when angles of rotation of an object around the Z-axis are 0°, −30°, −60°, and −90°.

In the present embodiment, seven shadow volume data are prepared beforehand for an object which casts a shadow and respective shadow volume data correspond to angles of rotation of the object around the Z-axis, 0°, 30°, 60°, 90°, −30°, −60°, and −90°, where the basic attitude of the object corresponds to 0°. FIG. 5 illustrates sets of shadow volumes and shadows in the game space which respectively correspond to the cases where angles of rotation of the object around the Z-axis are 0°, 30°, 60°, and 90°. FIG. 6 illustrates sets of shadow volumes and shadows in the game space which respectively correspond to the case where angles of rotation of the object around the Z-axis are 0°, −30°, −60°, and −90°. It should be noted that the shadows illustrated in FIGS. 5 and 6 are cast over a topographic object (an object over which a shadow is cast) which is a plane.

In the above-described method illustrated in FIG. 14, even if the object is rotated, the shadow in the game space does not change. However, according to the present invention, as shown in FIGS. 5 and 6, different shadow volumes are used in accordance with angles of rotation of the object, and therefore realistic shadows are created in accordance with the angles of rotation of the object.

The shadow volume data to be prepared beforehand may be faithfully created based on the shape of the object or may be roughly created based on the unevenness of the shape of the object.

Figure 7:
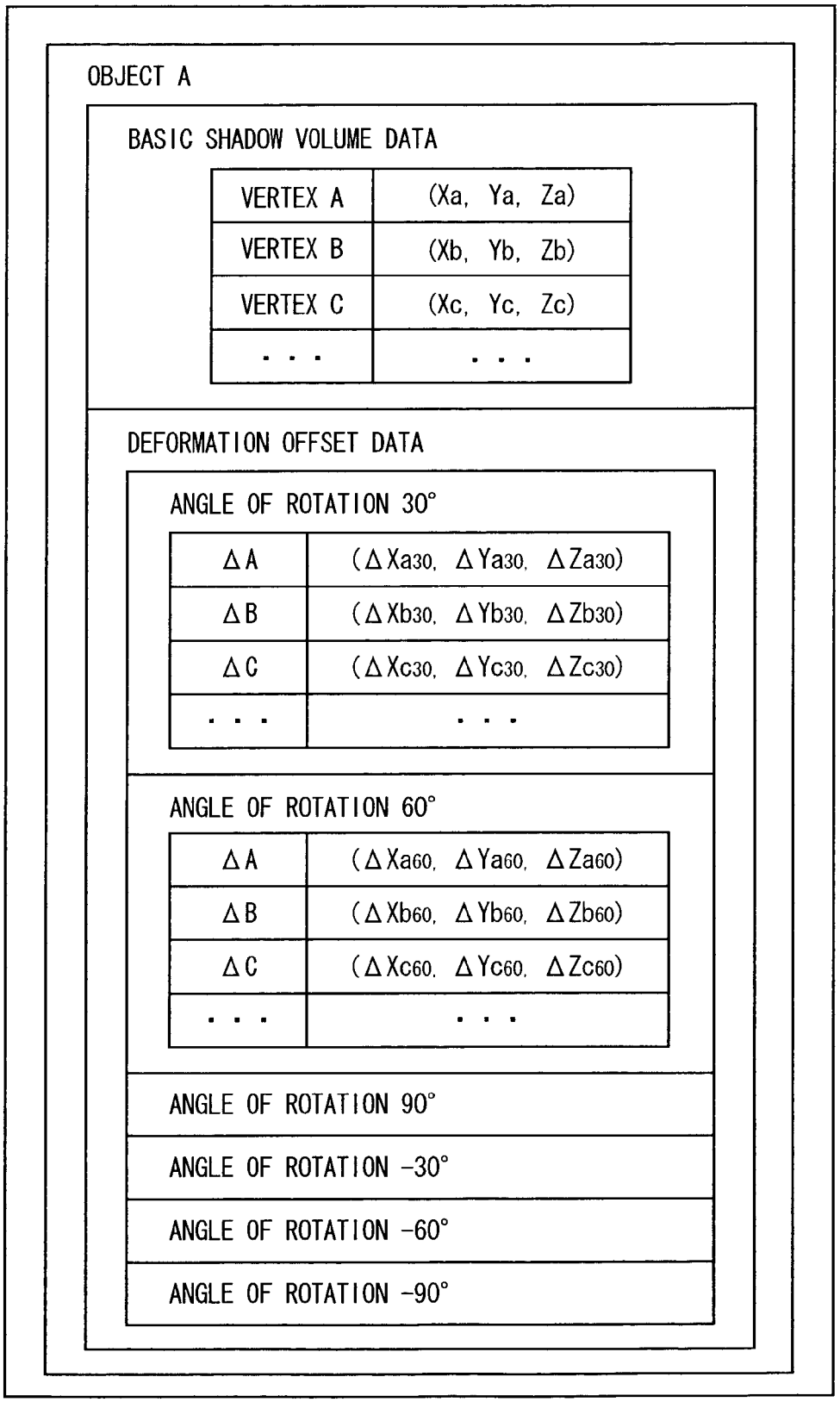
FIG. 7 is a diagram for explaining the details of shadow volume data.

The shadow volume data is previously stored in, for example, the DVD-ROM 300 (all the shadow volume data corresponding to the angles of rotation, 0°, 30°, 60°, 90°, −30°, −60°, and −90°, are stored), and read out into a memory of the game apparatus by the DVD drive 25, as necessary, so as to be used for shadow volume setting processing. In the present embodiment, shadow volume data for seven angles of rotation (0°, 30°, 60°, 90°, −30°, −60°, and −90°) is previously stored in the DVD-ROM 300, but the present invention is not limited to this. The number of angles of rotation to which the stored shadow volume data correspond may be at least two. FIG. 7 illustrates shadow volume data prepared beforehand for an object (in this case, object A). In FIG. 7, as the shadow volume data for object A, basic shadow volume data and deformation offset data are prepared beforehand. The basic shadow volume data defines the shape of the shadow volume corresponding to the angle of rotation of object A around the Z-axis, which is 0°, by coordinates of each vertex of the shadow volume (coordinates in the object coordinate system). The deformation offset data defines the respective shapes of the shadow volumes corresponding to angles of rotation of object A around the Z-axis, 30°, 60°, 90°, −30°, −60°, and −90°, by using offset data referencing the basic shadow volume data. For example, in the case where vertex A of the basic shadow volume data has coordinates (Xa, Ya, Za) and respective offset values of the coordinates of vertex A of the shadow volume for the angle of rotation of 30° are represented by ($\Delta Xa_{30}$, $\Delta Ya_{30}$, $\Delta Za_{30}$) with respect to the coordinates of the basic shadow volume data, vertex A of the shadow volume for the angle of rotation of 30° has coordinates (Xa+$\Delta Xa_{30}$, Ya$_{30}$ $\Delta Ya_{30}$, Za+$\Delta Za_{30}$).

Figure 8:
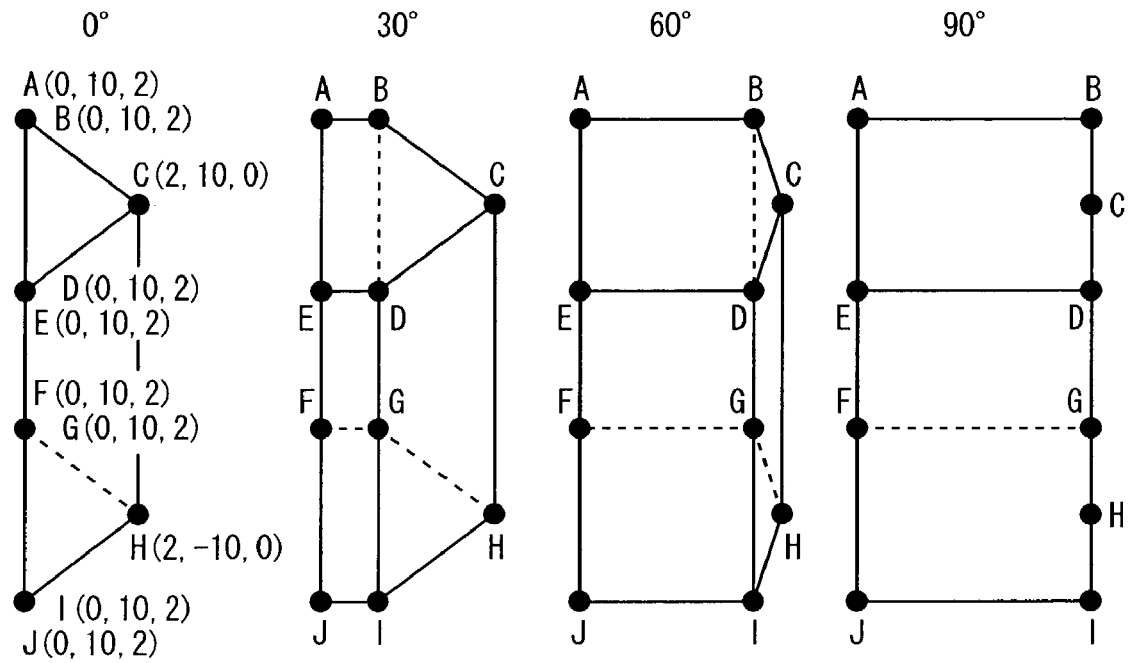
FIG. 8 is a diagram specifically illustrating the relationship between offset values and shapes of shadow volumes.

FIG. 8 specifically illustrates the relationship between the deformation offset data and shapes of actual shadow volumes. Vertex B of the basic shadow volume has coordinates (0, 10, 2). Coordinates of vertex B of the shadow volume for the angle of rotation of 30° are obtained by adding respective components of the offset value $\Delta B_{30}=(1, 0, 0)$ of vertex B for the angle of rotation of 30° to a corresponding component of coordinates (0, 10, 2) of vertex B of the basic shadow volume data, i.e., vertex B of the shadow volume for the angle of rotation of 30° has coordinates (1, 10, 2). Coordinates of vertex B of the shadow volume for the angle of rotation of 60° are obtained by adding respective components of the offset value $\Delta B_{60}=(3, 0, 0)$ of vertex B for the angle of rotation of 60° to a corresponding component of coordinates (0, 10, 2) of vertex B of the basic shadow volume data, i.e., vertex B of the shadow volume for the angle of rotation of 60° has coordinates (3, 10, 2). Coordinates of vertex B of the shadow volume for the angle of rotation of 90° are obtained by adding respective components of the offset value $\Delta B_{90}=(4, 0, 0)$ of vertex B for the angle of rotation of 90° to a corresponding component of coordinates (0, 10, 2) of vertex B of the basic shadow volume data, i.e., vertex B of the shadow volume for the angle of rotation of 90° has coordinates (4, 10, 2). Although not shown in the figure, coordinates of vertex B for the angle of rotation of −30°, −60°, or −90° are determined in the same manner.

In FIG. 8, the shape of a shadow volume is defined by ten vertexes, i.e., vertexes A–J. However, the locations and number of the vertexes are freely determined. In the example shown in FIG. 8, the way the shadow changes in accordance with the rotation of the triangular prism is simple, and therefore all the movements of vertexes are seen only in the X-axis direction. However, the present invention is not limited to this, and settings may be made such that each vertex moves along any direction in accordance with the rotation of the object.

As described above, in the present embodiment, offset data referencing the basic shadow volume data are prepared as the shadow volume data corresponding to the angles of rotation of the object, 30°, 60°, 90°, −30°, −60°, and −90°, but the present invention is not limited to this. Shadow volume data, which define shapes of shadow volumes by actual coordinates of vertexes as in the case of the basic shadow volume, may be used as the shadow volume data corresponding to angles of rotation of the object, 30°, 60°, 90°, −30°, −60°, and −90°.

As described above, when the angle of rotation of the object which casts a shadow is 0°, 30°, 60°, 90°, −30°, −60°, or −90°, it is possible to easily set the shadow volume based on the shadow volume data as shown in FIG. 7. A method for setting shadow volumes for the object which casts a shadow will now be described with respect to the case where the angle of rotation of the object around the Z-axis is an angle other than those described above.

In the present embodiment, when the angle of rotation of the object which casts a shadow is an angle other than 0°, 30°, 60°, 90°, −30°, −60°, and −90°, (e.g., 15°, −40°, etc.), the shadow volume is dynamically set by linear interpolation based on the prepared shadow volume data. The linear interpolation will be more specifically described below.

When the angle of rotation of the object which casts a shadow is $\alpha°$, coordinates of vertex A of the shadow volume is obtained by calculating the offset value $\Delta A_\alpha$ when the angle of rotation of the object which casts a shadow is $\alpha°$. The offset value $\Delta A_\alpha$ is calculated by expressions shown below. It should be noted that coordinates of vertexes other than vertex A (i.e., vertexes B, C, . . . ) can be calculated in the same manner.

(1) when $0<\alpha<30$, $\Delta A_\alpha = \Delta A_{30} \times \alpha/30$;

(2) when $30<\alpha<60$, $\Delta A_\alpha = \{\Delta A_{30} \times (60-\alpha) + \Delta A_{60} \times (\alpha-30)\}/30$;

(3) when $60<\alpha<90$, $\Delta A_\alpha = \{\Delta A_{60} \times (90-\alpha) + \Delta A_{90} \times (\alpha-60)\}/30$;

(4) when $-30<\alpha<0$, $\Delta A_\alpha = -\Delta A_{-30} \times \alpha/30$;

(5) when $-60<\alpha<-30$, $\Delta A_\alpha = -\{\Delta A_{-30} \times (-60-\alpha) + \Delta A_{-60} \times (\alpha+30)\}/30$; and (6) when $-90<\alpha<60$, $\Delta A_\alpha = -\{\Delta A_{-60} \times (-90-\alpha) + \Delta A_{-90} \times (\alpha+60)\}/30$;

In this manner, when there is no prepared shadow volume data corresponding to an angle of rotation of the object which casts a shadow, the shadow volume data corresponding to the angle of rotation of the object which casts a shadow is set by linear interpolation based on two of the prepared shadow volume data. It should be noted that the type of interpolation is not limited to the linear interpolation, and any function expression can be used for interpolation. However, it is advantageous to use the linear interpolation in that calculation for setting shadow volumes can be simplified.

Once the shadow volume corresponding to the angle of rotation of the object which casts a shadow is set in the above-described manner, the shadow is drawn based on the set shadow volume. Consequently, it is possible to display a realistic shadow in accordance with the attitude of the object which casts a shadow.

An operation of the CPU 10 or the GPU 11 according to the present embodiment will now be described with reference to the flowcharts illustrated in FIGS. 9–12.

Figure 9:
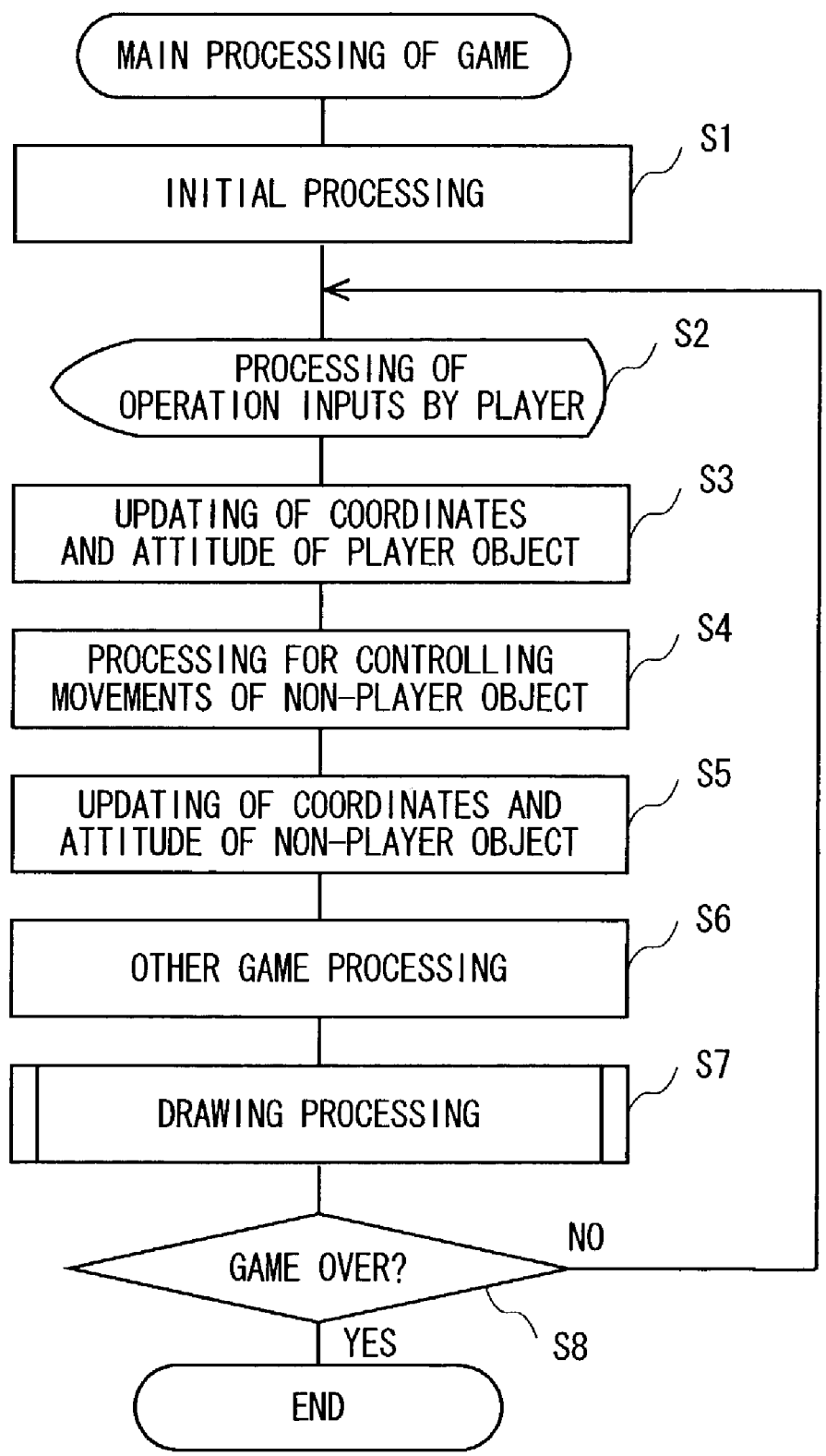
FIG. 9 is a flowchart illustrating the procedure of game processing.

Referring to FIG. 9, the main processing of a game is described. Firstly, initial processing, e.g., initialization processing of variables, displaying of the initial state screen, etc., is performed (step S1). Next, when the game is started, processing of operation inputs by the player is accepted (step S2), and the coordinates and attitude of a player object are updated based on the operation inputs by the player and various factors in the game (e.g., forces applied by contacts between objects, by the ground, etc.) (step S3). After step S3, based on a program for controlling movements of a non-player object, which is stored in the DVD-ROM 300, processing for controlling movements of the non-player object is performed (step S4), and the coordinates and attitude of the non-player object are updated (step S5). After step S5, other game processings (e.g., combat processing, menu processing, etc.) are performed (step S6), and thereafter drawing processing is performed (step S7). The drawing processing will be described later with reference to FIG. 10. After step S7, whether or not the game is over is determined in step S8. If the game is over, the game processing is terminated. If it is not over yet, the procedure returns to step S1 to repeat the processing of step S1–S8.

Figure 10:
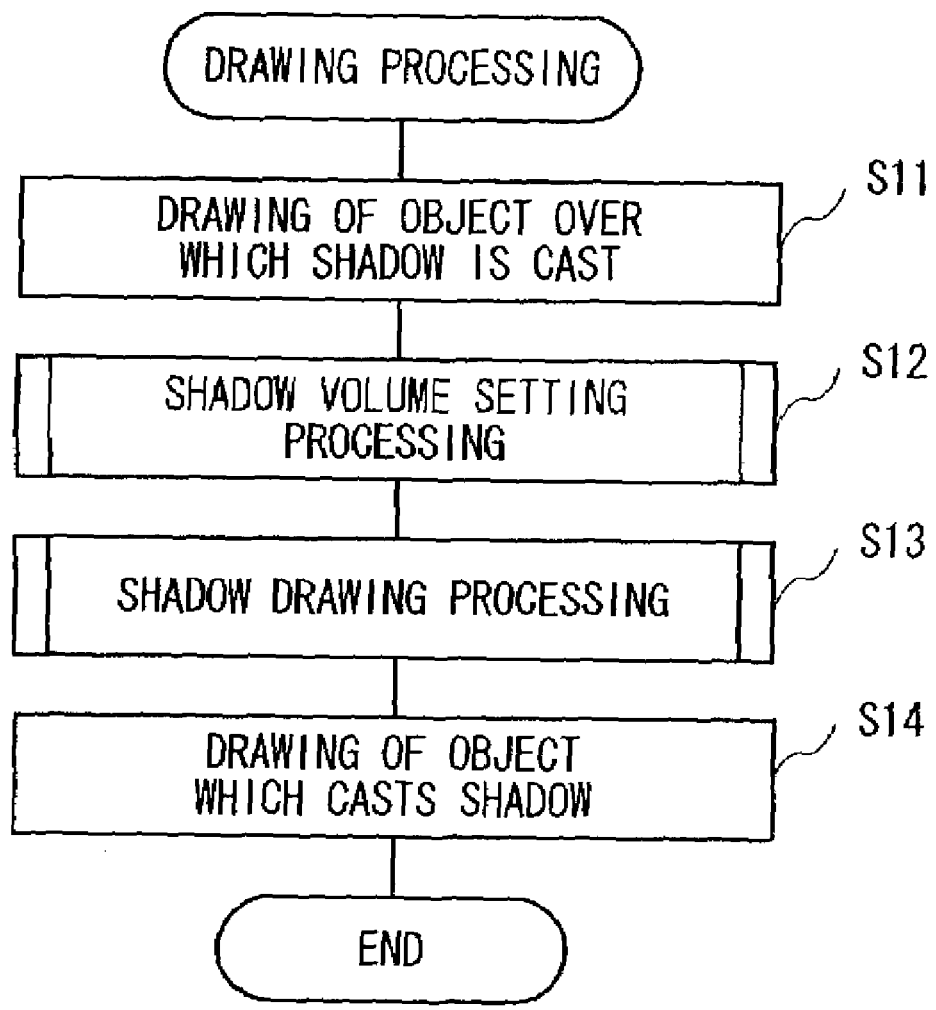
FIG. 10 is a flowchart illustrating the procedure of drawing processing.

Referring to FIG. 10, the drawing processing of step S7 illustrated in FIG. 9 will now be described. When the drawing processing is started, the GPU 11 compares depth information of the object over which a shadow is cast (the topographic object) with the value of the Z-buffer 15 and suitably updates the value of the Z-buffer 15 while drawing the object over which a shadow is cast in the color buffer 14 (step S11). When drawing of the object over which a shadow is cast is completed, the CPU 10 performs shadow volume setting processing for setting shadow volumes of objects which cast a shadow (the player and non-player objects) (step S12). The details of the shadow volume setting processing will be described later. When the shadow volume setting processing is completed, the GPU 11 performs shadow drawing processing based on the shadow volumes set by the shadow volume setting processing (step S13). The details of the shadow drawing processing will be described later. When the shadow drawing processing is completed, the GPU 11 compares depth information of the object which casts a shadow with the value of the Z-buffer 15 and suitably updates the value of the Z-buffer 15 while drawing the object which casts a shadow in the color buffer 14 (step S14). When drawing of the object which casts a shadow is completed, the drawing process is terminated.

Figure 11:
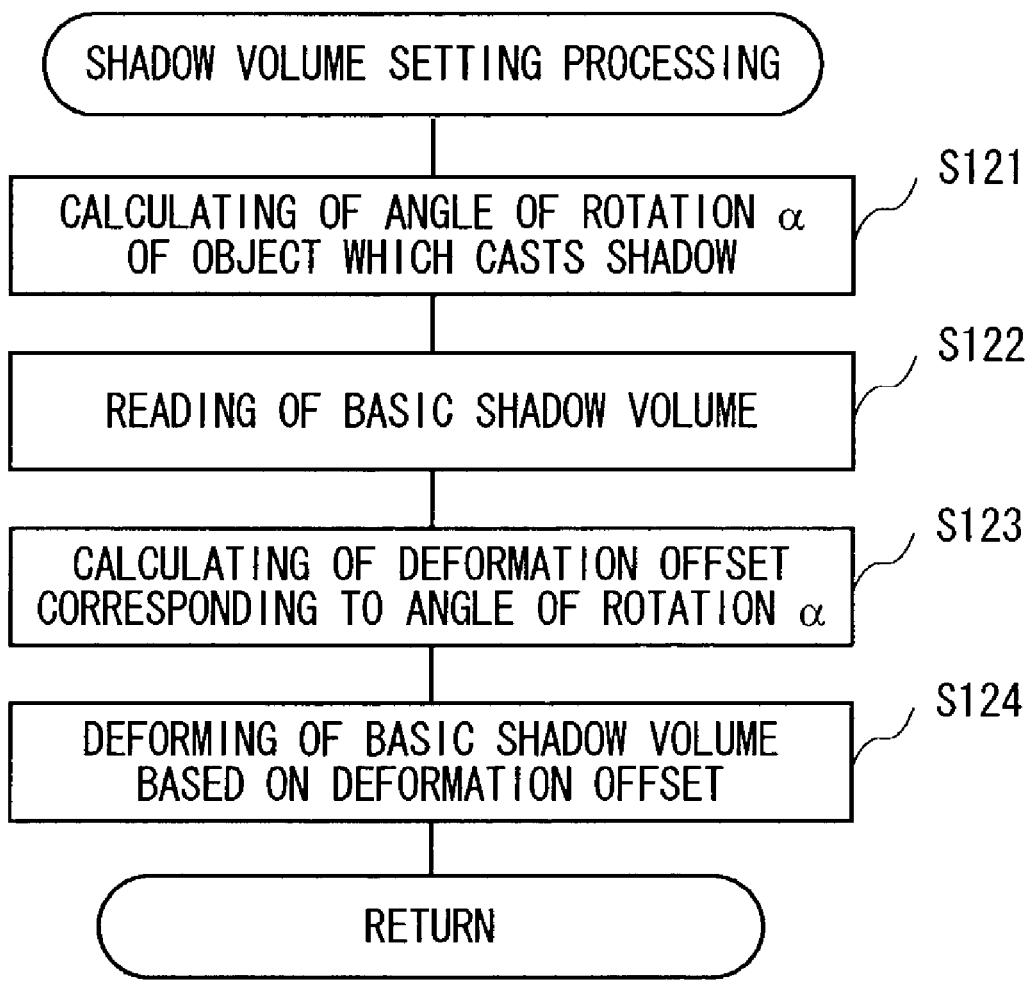
FIG. 11 is a flowchart illustrating the procedure of the process for setting the shadow volume.

Referring to FIG. 11, the shadow volume setting process of step S12 illustrated in FIG. 10 will now be described. When the shadow volume setting process is started, the CPU 10 calculates the angle of rotation $\alpha$ of the object, which casts a shadow, around the Z-axis (step S121). Next, the CPU 10 reads basic shadow volume data (step S122). Then, the CPU 10 calculates a deformation offset corresponding to the angle of rotation $\alpha$ calculated at step S121 (step S123). Specifically, in the case where the deformation offset data corresponding to the angle of rotation $\alpha$ is prepared beforehand, the prepared data is read. Otherwise, linear interpolation is performed based on two shadow volume data corresponding to angles of rotation in the neighborhood of the prepared angle of rotation $\alpha$, so as to calculate the deformation offset corresponding to the angle of rotation $\alpha$ (e.g., the aforementioned $\Delta A_\alpha$ or the like). When calculating of the deformation offset corresponding to the angle of rotation $\alpha$ is completed, the shadow volume is set based on the deformation offset and the basic shadow volume data (i.e., by deforming the basic shadow volume based on the deformation offset) (step S124). When setting of the shadow volume is completed, the procedure returns to the drawing processing illustrated in FIG. 10.

Figure 12:
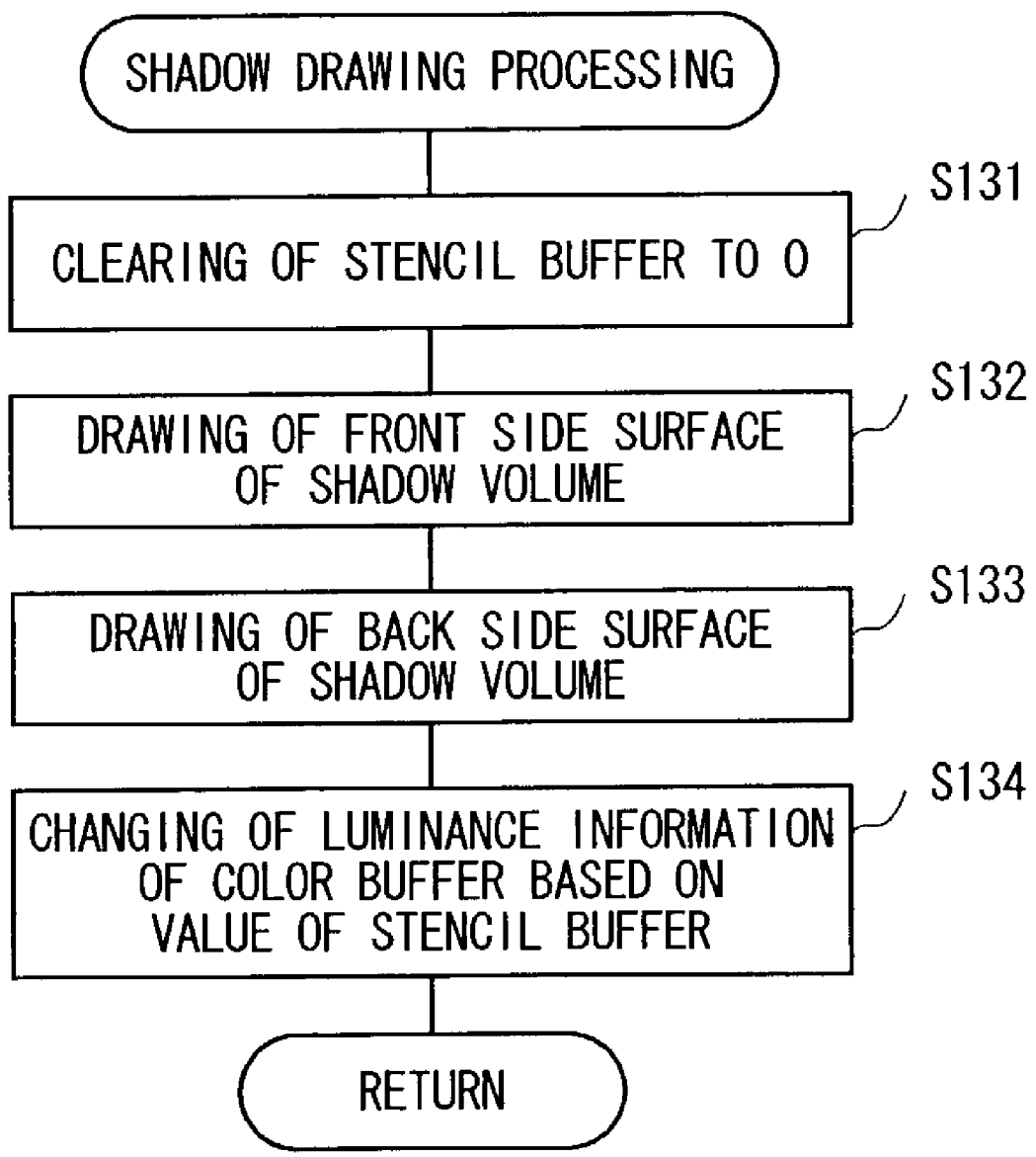
FIG. 12 is a flowchart illustrating the procedure of the processing for drawing a shadow.

Referring to FIG. 12, the shadow drawing processing of step S13 illustrated in FIG. 10 will now be described. When the shadow drawing process is started, the GPU 11 initially clears each pixel value in the stencil buffer 16, which is a buffer used for determining a shadow (step S131), to 0 and then draws the front side surfaces of the shadow volume with reference to the Z-buffer 15 (step S132). In this case, each pixel value in the stencil buffer 16 is incremented instead of writing color information to the color buffer 14. Next, the back side surfaces of the shadow volume is drawn with reference to the Z-buffer 15 (step S133). In this case, each pixel value in the stencil buffer 16 is decremented instead of writing color information to the color buffer 14. Based on the thus-written value of each pixel in the stencil buffer 16, the GPU 11 changes luminance information of each pixel in the color buffer 14 (step S134). When the shadow drawing processing is completed in this manner, the procedure returns to the drawing processing illustrated in FIG. 10.

As described above, in the present embodiment, a plurality of shadow volume data corresponding to several attitudes of the object which casts a shadow are prepared beforehand, and interpolation is performed based on these shadow volume data as necessary, thereby setting the shadow volume corresponding to the attitude of the object. Accordingly, for example, in game processing, it is not necessary to set the shadow volume based on the outline of the object which casts a shadow or edges of a plurality of polygons forming the object each time the attitude of the object is changed. As a result, the processing load of drawing a shadow can be reduced. Moreover, the shadow volume is used for drawing a shadow, and therefore it is possible to draw a more realistic shadow which reflects the unevenness of the object over which a shadow is cast.

In the present embodiment, the game program is supplied to the main body of the game machine 100 via the DVD-ROM 300, but the present invention is not limited to this. The game program may be stored in any computer-readable recording medium other than the DVD-ROM 300, e.g., a CD-ROM, an MO, a memory card, a ROM cartridge, or the like, and supplied to the main body of game machine 100 via such a medium. Alternatively, the game program may be previously incorporated into the main body of game machine 100. Still alternatively, the game program may be supplied to the main body of the game machine 100 via a communication line.

Furthermore, in the present embodiment, the GPU 11 performs the drawing process, etc. Such processings may be performed by the CPU 10.

Further still, in the present embodiment, the case where shadows created by using parallel light are drawn is described, but the present invention is not limited to this. The present invention is applicable to the case where shadows created by using, for example, light from a point source of light.

Further still, in the present embodiment, the attitude of the object which casts a shadow is changed by rotation around the Z-axis. The present invention is also applicable to the case where the object which casts a shadow rotates about a plurality of axes. In such a case, for example, shadow volume data is prepared beforehand for each combination of the angle of rotation around the Z-axis and the angle of rotation around the X-axis, and the shadow volumes are set based on these shadow volume data. This allows shadows to be drawn in accordance with rotation of the object which casts a shadow around the plurality of axes.

Further still, in the present embodiment, the attitude of the object which casts a shadow is changed by rotation around the Z-axis. The present invention is also applicable to the case where the shape of the object itself is changed. In such a case, for example, a plurality of shadow volume data corresponding to a plurality of deformation states are prepared beforehand, and the shadow volumes are set based on these shadow volume data. This allows shadows to be drawn in accordance with deformation of the object which casts a shadow.

Further still, the symmetry of the attitude of the object which casts a shadow can be utilized to reduce the number of shadow volume data to be previously stored in the DVD-ROM 300 or the like. Such contrivance is described below with reference to FIG. 13.

Figure 13:
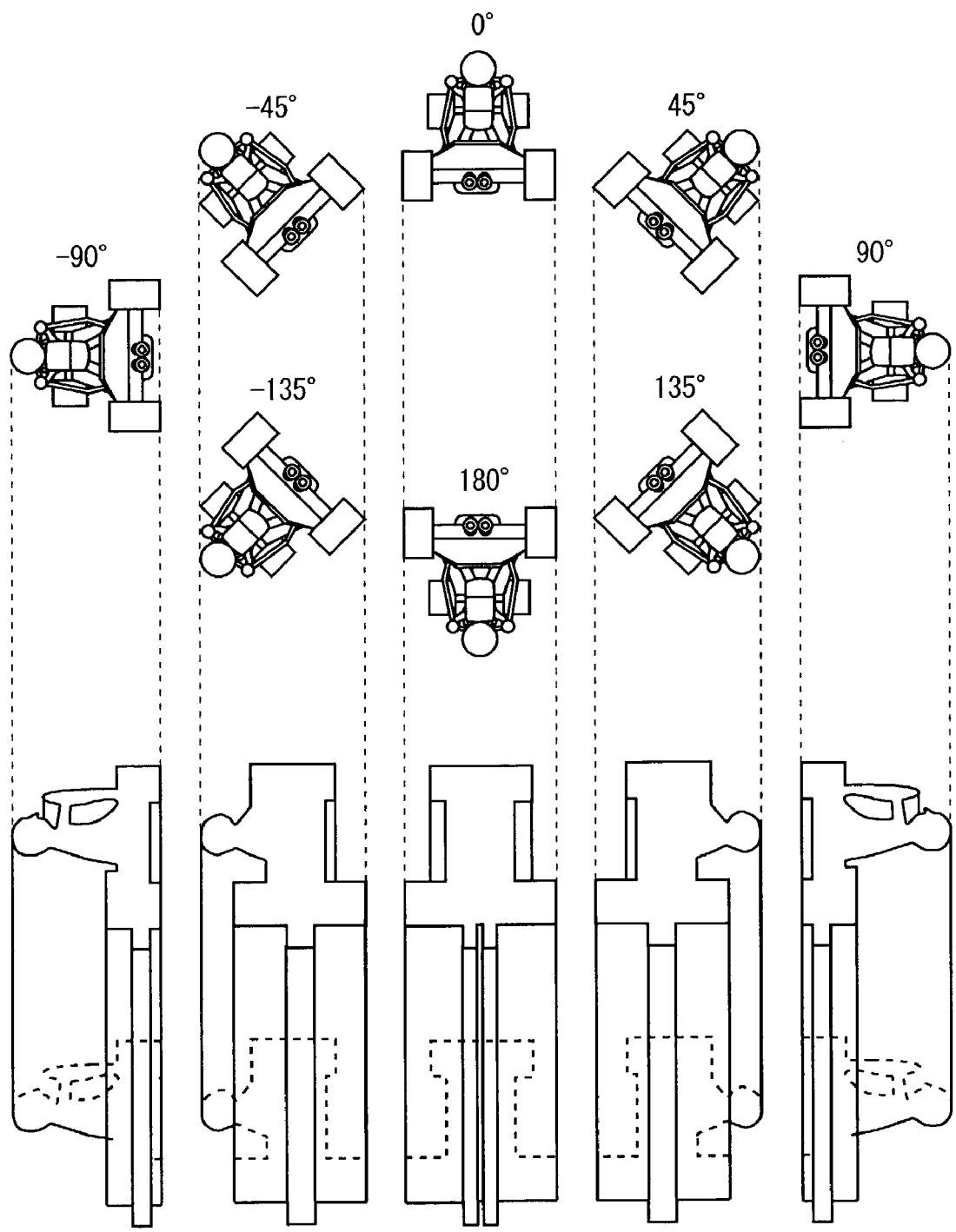
FIG. 13 is a diagram for explaining the sharing of shadow volume data.

FIG. 13 is a diagram illustrating attitudes of a character object in a cart race game and shapes of a shadow volume in the case where the object is rotated about an axis along a progress direction of the cart. In this case, the character object is irradiated with parallel light from directly thereabove (from vertically above the cart with respect to the progress direction). In the example of FIG. 13, shapes of the shadow volume are identical to each other with respect to the angles of rotation of 0° and 180°. Further, shapes of the shadow volume are identical to each other with respect to the angles of rotation of 45° and 135°. Furthermore, shapes of the shadow volume are identical to each other with respect to the angles of rotation of −45° and 135°. Accordingly, shadow volume data for the angles of rotation of 45°, 0°, and −45° can be commonly used as shadow volume data for the angles of rotation of 135°, 180°, and −135°, respectively. More generally, if shadow volume data corresponding to rotation halfway around the rotation axis (in this case, −90° to 90°) is prepared beforehand, shadow volume corresponding to rotation all the way around the rotation axis (i.e., 360°) can be set. However, this is only applicable to the case where shapes of the object which casts a shadow are symmetric with respect to a plane which includes the rotation axis.

In FIG. 13, comparing the shadow volume for the angle of rotation of 45° and the shadow volume for the angle of rotation of −135°, it is found that these shadow volumes are in reversed relationship to each other with respect to the right and left directions in the figure. The same can be said of the relationship between the shadow volume for the angle of rotation of 90° and the shadow volume for the angle of rotation of −90°. Moreover, the same can be said of the relationship between the shadow volume for the angle of rotation of 135° and the shadow volume for the angle of rotation of −45° Accordingly, the shadow volume data for the angles of rotation −135°, −90°, and −45° can be commonly used for the shadow volume data for the angles of rotation 45°, −90°, and 135°, respectively. That is, a single shadow volume can be used for two attitudes differing from each other by 180° in the angle of rotation. However, in such a case, for setting the shadow volume, it is necessary to additionally perform simple calculations for reversing the shape of the shadow volume (e.g., conversion of offset values, conversion of coordinates of vertexes, etc.).

By combining the above two contrivances together, it is possible to further reduce the number of shadow volume data to be previously stored. Specifically, in FIG. 13, the shadow volume data for the angle of rotation of 0° can be used for the shadow volume data for the angle of rotation of 180°. Further, the shadow volume data for the angle of rotation of 45° can be used for the shadow volumes for the angles of rotation of 135°, −135°, and −45°. Furthermore, the shadow volume data for the angle of rotation of 90° can be used for the shadow volume for the angle of rotation of −90°. That is, if the shadow volume data corresponding to a quarter way around the rotation axis (in this case, 0° to 90°) is prepared, it is possible to set shadow volumes corresponding to all the way around the rotation axis (i.e., 360°).

While the invention has been described in detail, the foregoing description is in all aspects illustrative and not restrictive. It is understood that numerous other modifications and variations can be devised without departing from the scope of the invention.

What is claimed is:

1. A game system for displaying a shadow of an object in a three-dimensional game space by using a shadow volume, the game system comprising:
   an attitude changing processing mechanism for changing an attitude of the object;
   first shadow volume data storage locations having stored therein first shadow volume data corresponding to a first attitude of the object;
   second shadow volume data storage locations having stored therein second volume data corresponding to a second attitude of the object which is different from the first attitude;
   a shadow volume setting processing mechanism for setting the shadow volume based on the first shadow volume data when the attitude of the object, which is changed by the attitude changing mechanism, at a certain point in time corresponds with the first attitude and for setting the shadow volume based on the second shadow volume data when the attitude of the object at the certain point in time corresponds with the second attitude; and
   a shadow drawing processing mechanism for drawing a shadow of the object at the certain point in time based on the shadow volume set by the shadow volume setting processing mechanism.

2. The game system according to claim 1, wherein the shadow volume setting processing mechanism sets the shadow volume by interpolation based on the first shadow volume data and the second shadow volume data when the attitude of the object at the certain point in time is different from both the first attitude and the second attitude.

3. The game system according to claim 2, wherein the interpolation is linear interpolation.

4. The game system according to claim 1, wherein the second shadow volume data is offset data referencing the first shadow volume data.

5. The game system according to claim 1, wherein:
   the attitude changing processing mechanism rotates the object about a prescribed axis in an object coordinate system;
   the second attitude is an attitude of the object rotated around the prescribed axis by a certain angle from the first attitude; and
   the shadow volume setting processing mechanism sets the shadow volume based on the angle of rotation of the object around the prescribed axis.

6. The game system according to claim 5, wherein when the attitude of the object at the certain point in time is equal to a third attitude which is in a prescribed relationship to the first attitude, the shadow volume setting processing mechanism sets the shadow volume by using the first shadow volume data as shadow volume data corresponding to the third attitude.

7. The game system according to claim 6, wherein shapes of the object are symmetric with respect to a plane including the prescribed axis.

8. The game system according to claim 6, wherein the third attitude is an attitude of the object rotated around the prescribed axis by 180° from the first attitude.

9. A computer readable medium encoded with a game program executed by a computer in a game apparatus for displaying a shadow of an object in a three-dimensional game space by using a shadow volume, the game program causing the computer to execute:
   an attitude changing step for changing an attitude of the object;
   a first shadow volume data reading step for reading a previously stored first shadow volume data corresponding to a first attitude of the object;
   a second shadow volume data reading step for reading a previously stored second shadow volume data corresponding to a second attitude of the object which is different from the first attitude;
   a shadow volume setting step for setting the shadow volume based on the first shadow volume data when the attitude of the object, which is changed by the attitude changing step, at a certain point in time corresponds with the first attitude and for setting the shadow volume based on the second shadow volume data when the attitude of the object at the certain point in time corresponds with the second attitude; and a shadow drawing step for drawing a shadow of the object at the certain point in time based on the shadow volume set by the shadow volume setting step.

10. The computer readable medium according to claim 9, wherein when the attitude of the object at the certain point in time is different from both the first attitude and the second attitude, the shadow volume setting step sets the shadow volume by interpolation based on the first shadow volume data and the second shadow volume data.

11. The computer readable medium according to claim 10, wherein the interpolation is linear interpolation.

12. The computer readable medium according to claim 9, wherein the second shadow volume data is offset data referencing the first shadow volume data.

13. The computer readable medium according to claim 9, wherein:
the attitude changing step rotates the object about a prescribed axis in an object coordinate system;
the second attitude is an attitude of the object rotated around the prescribed axis by a certain angle from the first attitude; and
the shadow volume setting step sets the shadow volume based on the angle of rotation of the object around the prescribed axis.

14. The computer readable medium according to claim 9, wherein when the attitude of the object at the certain point in time is equal to a third attitude which is in a prescribed relationship to the first attitude, the shadow volume setting step sets the shadow volume by using the first shadow volume data, which is left unchanged or is suitably changed, as shadow volume data corresponding to the third attitude.

15. The computer readable medium according to claim 14, wherein shapes of the object are symmetric with respect to a plane including the prescribed axis.

16. The computer readable medium according to claim 14, wherein the third attitude is an attitude of the object rotated around the prescribed axis by 180° from the first attitude.

* * * * *